(12) United States Patent
Gangadharan (10) Patent No.: US 8,646,074 B1
(45) Date of Patent: Feb. 4, 2014

(54) SYSTEMS AND METHODS FOR ENABLING OTHERWISE UNPROTECTED COMPUTING DEVICES TO ASSESS THE REPUTATIONS OF WIRELESS ACCESS POINTS

(75) Inventor: Haridharan Nattamai Gangadharan, Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/420,482

(22) Filed: Mar. 14, 2012

(51) Int. Cl.
*G08B 23/00* (2006.01)

(52) U.S. Cl.
USPC ............................................................ 726/22

(58) Field of Classification Search
USPC ............................................................ 726/22
See application file for complete search history.

(56) References Cited

U.S. PATENT DOCUMENTS

| | | | |
|---|---|---|---|
| 2006/0230279 A1* | 10/2006 | Morris | 713/182 |
| 2009/0234663 A1* | 9/2009 | McCann et al. | 705/1 |
| 2010/0299518 A1* | 11/2010 | Viswanathan et al. | 713/152 |
| 2011/0047620 A1* | 2/2011 | Mahaffey et al. | 726/23 |
| 2011/0208866 A1* | 8/2011 | Marmolejo-Meillon et al. | 709/227 |
| 2013/0040603 A1* | 2/2013 | Stahlberg et al. | 455/410 |
| 2013/0167230 A1* | 6/2013 | Etchegoyen | 726/22 |

\* cited by examiner

*Primary Examiner* — Cordelia Zecher
(74) *Attorney, Agent, or Firm* — ALG Intellectual Property, LLC (57) ABSTRACT

The instant disclosure describe various exemplary methods for enabling otherwise unprotected computing devices to assess the reputations of wireless access points. In one example, a computer-implemented method for performing such a task may include (1) identifying, at a computing device that is otherwise unable to assess the reputations of wireless access points, at least one wireless access point that is available to the computing device, (2) obtaining, from a reputation service, reputation information for the wireless access point that identifies the reputation of the wireless access point, wherein the reputation information is based at least in part on prior interactions with the wireless access point by at least one additional computing device, and then (3) presenting the reputation information to a user of the computing device to help the user determine whether to connect to the wireless access point. Various other methods, systems, and computer-readable media are also disclosed.

20 Claims, 9 Drawing Sheets

```
                            Report
                             500

--------------------------------------------------------------------------------
****************************************************************
WAP SSID: FREE_WIFI
WAP BSSID: 01:23:45:67:89:AB
PROTOCOL: 802.11N
NETWORK CHANNEL: 11
****************************************************************
ENDPOINT SIGNAL STRENGTH: 65 dBm
ENDPOINT GEOLOCATION: 40.560793,-111.916118
****************************************************************
GATEWAY IP ADDRESS: 107.4.102.111
****************************************************************
DETECTED ATTACKS:
SIGNATURE: 0x37FA
TIMESTAMP: 2012-10-13 T 10:45 UTC
SIGNATURE: 0x94EB
TIMESTAMP: 2012-10-13 T 11:05 UTC
```

SYSTEMS AND METHODS FOR ENABLING OTHERWISE UNPROTECTED COMPUTING DEVICES TO ASSESS THE REPUTATIONS OF WIRELESS ACCESS POINTS

BACKGROUND

Consumers and businesses face a growing tide of malicious software that threatens the stability and performance of their computers and the security of their data. For example, computer programmers with malicious intent have created and continue to create and propagate viruses, Trojans, spyware, worms, and other programs (collectively known as "malware") in an attempt to compromise computer systems.

Security researchers estimate that the majority of the malware generated today is deployed and/or proliferated via the Internet. In view of this, many security-software firms offer (either as a stand-alone application or as part of a larger suite of security applications) various network-security applications that monitor, control, and thus secure the network activity of a computing device. Unfortunately, some computing platforms (especially mobile computing platforms, such as APPLE IOS and GOOGLE ANDROID devices) do not permit or allow the installation of traditional network-security applications, leaving these devices exposed to the various dangers of the Internet.

SUMMARY

As will be described in greater detail below, the instant disclosure generally relates to systems and methods for enabling otherwise unprotected computing devices to assess the reputations of wireless access points in order to prevent such devices from unknowingly connecting to insecure and/or unsafe networks. In one example, these systems and methods may provide a measure of protection to computing platforms that block or prevent the installation of other forms of network-security applications.

In one example, a computer-implemented method for performing the above-described tasks may include (1) identifying, at a computing device that is otherwise unable to assess the reputations of wireless access points, at least one wireless access point that is available to the computing device, (2) obtaining, from a reputation service, reputation information for the wireless access point that is based at least in part on prior interactions with the wireless access point (and/or an Internet gateway associated with the wireless access point) by at least one additional computing device, and (3) presenting the reputation information to a user of the computing device to help the user determine whether to connect to the wireless access point.

In one embodiment, obtaining the reputation information may include (1) transmitting a request for the reputation information to the reputation service that includes information that identifies the wireless access point and then (2) receiving, in response to the request, the reputation information from the reputation service. In another embodiment, obtaining the reputation information may include retrieving the reputation information from a local cache stored on the computing device.

The obtained reputation information may include reputation information for all wireless access points that are currently available to the computing device and/or reputation information for all known wireless access points within a specific geographic region. This reputation information may be obtained via a cellular data connection and/or via at least one additional wireless access point.

In one embodiment, the reputation service may generate the reputation information for the wireless access point by obtaining and analyzing information concerning the prior interactions with the wireless access point and/or with an Internet gateway associated with the wireless access point. Examples of this information include, without limitation, information that identifies the wireless access point and/or the Internet gateway, information that identifies whether communications with the wireless access point are encrypted, and/or information that identifies at least one attack that originated from the wireless access point and/or Internet gateway (e.g., information that identifies at least one attack that originated from a device connected to the wireless access point and/or Internet gateway).

Examples of the types of information that may identify (or be used to identify) the wireless access point and/or Internet gateway include, without limitation, a Service Set Identifier (SSID) associated with the wireless access point, a Basic Service Set Identifier (BSSID) associated with the wireless access point, a wireless networking protocol employed by the wireless access point, the additional computing device's signal strength when connected to the wireless access point, a wireless networking channel number employed by the wireless access point, a geolocation of the additional computing device, an IP address associated with the Internet gateway, and/or a geolocation of the Internet gateway. In one example, the information that identifies the attack that originated from the wireless access point and/or Internet gateway may include information that identifies the type and/or severity of the attack.

In one embodiment, the above-described method may also include (1) determining, based at least in part on the reputation information, that the wireless access point fails to satisfy a predetermined reputation threshold and then (2) recommending at least one alternate wireless access point to the user that satisfies the predetermined reputation threshold. This embodiment may also include (1) detecting an attempt by the computing device to connect to the wireless access point that fails to satisfy the predetermined reputation threshold and then (2) performing at least one action that results in increased network security on the computing device. In some examples, the reputation information may be presented using one or more items of text, graphics, colors, and/or sounds.

In one embodiment, a system for implementing the above-described method may include an identification module programmed to identify, at a computing device that is otherwise unable to assess the reputations of wireless access points, at least one wireless access point that is available to the computing device. The system may also include a reputation module programmed to obtain, from a reputation service, reputation information for the wireless access point that is based at least in part on prior interactions with the wireless access point by at least one additional computing device. In some examples, the system may also include a display module programmed to present the reputation information to a user of the computing device to help the user determine whether to connect to the wireless access point. The system may also include at least one processor configured to execute the identification module, the reputation module, and the display module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify, at a computing device that is otherwise unable to assess the reputations of wireless access points, at least one wireless access point that is available to the computing device, (2) obtain, from a reputation service, reputation information for the wireless access point that is based at least in part on prior interactions with the wireless access point by at least one additional computing device, and then (3) present the reputation information to a user of the computing device to help the user determine whether to connect to the wireless access point.

As will be explained in greater detail below, by obtaining and then presenting information to a user of a computing device that identifies the reputation of a particular wireless access point available to the computing device, the systems and methods described herein may enable the user to accurately assess the reputation of this wireless access point even if the user has not otherwise installed security software capable of managing or securing the user's network activity. As such, the systems and methods described herein may increase the state of security of computing platforms (such as APPLE IOS or GOOGLE ANDROID devices) that do not permit or allow the installation of traditional network-security applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
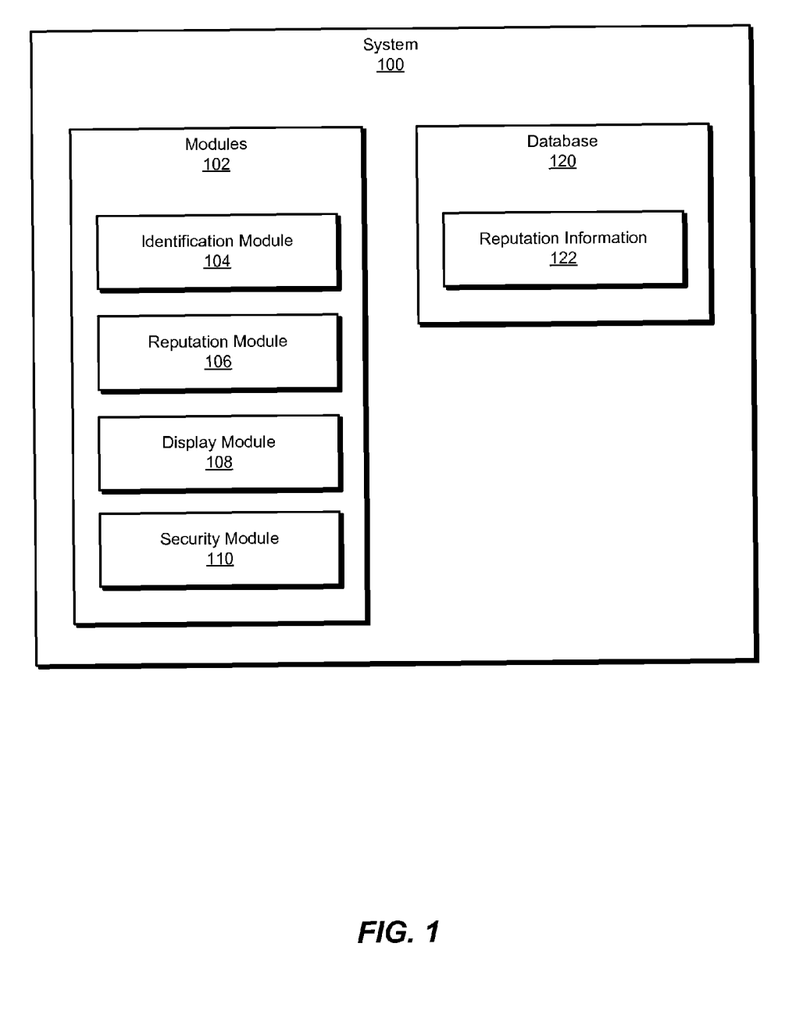
FIG. 1 is a block diagram of an exemplary system for enabling otherwise unprotected computing devices to assess the reputations of wireless access points.
Figure 2:
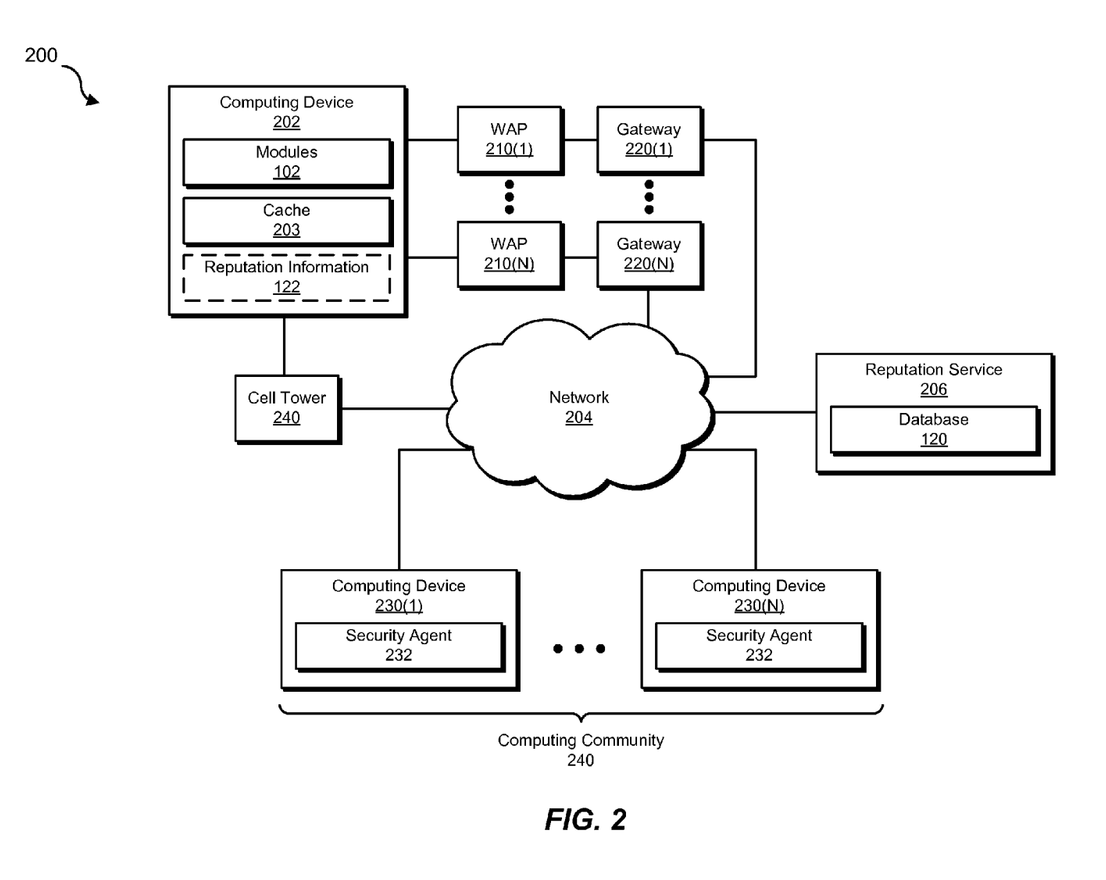
FIG. 2 is a block diagram of an exemplary system for enabling otherwise unprotected computing devices to assess the reputations of wireless access points.

The following will provide, with reference to FIGS. 1-2, detailed descriptions of exemplary systems for enabling otherwise unprotected computing devices to assess the reputations of wireless access points. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for enabling otherwise unprotected computing devices to assess the reputations of wireless access points. As illustrated in this figure, exemplary system 100 may include one or more modules 102 for performing one or more tasks. For example, and as will be explained in greater detail below, exemplary system 100 may include an identification module 104 programmed to identify, at a computing device that is otherwise unable to assess the reputations of wireless access points, at least one wireless access point that is available to the computing device. System 100 may also include a reputation module 106 programmed to obtain, from a reputation service, reputation information for the wireless access point that is based at least in part on prior interactions with the wireless access point by at least one additional computing device.

In some examples, system 100 may also include a display module 108 programmed to present the reputation information to a user of the computing device to help the user determine whether to connect to the wireless access point. In addition, system 100 may include a security module 110 programmed to perform at least one action that results in increased network security on the computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or reputation service 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputation information 122 for wireless access points and/or Internet gateways. Database 120 may represent portions of a single database or computing device or a plurality of databases or computing devices. For example, database 120 may represent a portion of reputation service 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as computing device 202, computing devices 230(1)-(N), reputation service 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a reputation service 206 via a network 204.

In one embodiment, one or more of modules 102 from FIG. 1 may, when executed by at least one processor of computing device 202, enable computing device 202 to assess the reputations of wireless access points. For example, and as will be described in greater detail below, one or more of modules 102 may cause computing device 202 to (1) identify at least one wireless access point (e.g., WAP 210(1)) that is available to the computing device, (2) obtain, from a reputation service (e.g. reputation service 206), reputation information for the wireless access point (e.g., reputation information 122) that is based at least in part on prior interactions with the wireless access point by at least one additional computing device (e.g., devices within computing community 240), and then (3) present the reputation information to a user of the computing device to help the user determine whether to connect to the wireless access point.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 810 in FIG. 8, or any other suitable computing device.

In one example, computing device 202 may represent a mobile computing device (such as a smartphone) that is capable of connecting to network 204 via a cell tower 240. Cell tower 240 generally represents any type or form of device capable of facilitating cellular data connections, such GPRS, EDGE, EV-DO, and LTE cellular data connections.

In another example, computing device 202 may connect to network 204 via one or more wireless access points 210(1)-(N) and/or gateways 220(1)-(N). Each of wireless access points 210(1)-(N) and gateways 220(1)-(N) generally represent any type or form of device capable of enabling other devices to connect to a network (such as the Internet) using one or more wired or wireless standards, such as WIFI or BLUETOOTH.

Reputation service 206 generally represents any type or form of computing device that is capable of generating and/or providing reputation information for wireless access points and/or Internet gateways. Examples of reputation service 206 include, without limitation, application servers and database servers configured to provide various database services and/or run certain software applications. In some examples, reputation service 206 may be managed by a security-software publisher.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication between computing device 202 and reputation service 206.

Computing devices 230(1)-(N) generally represent any type or form of computing device capable of reading computer-executable instructions. Examples of computing devices 230(1)-(N) include, without limitation, laptops, tablets, desktops, servers, cellular phones, personal digital assistants (PDAs), multimedia players, embedded systems, combinations of one or more of the same, exemplary computing system 810 in FIG. 8, or any other suitable computing device. In one example, computing devices 230(1)-(N) may represent all or a portion of a computing community, such as computing community 240, which may represent the user base of a security-software publisher. In some examples, each of computing devices 230(1)-(N) may include a security agent 232 designed to monitor, secure, and report interactions with wireless access points and/or Internet gateways.

Figure 3:
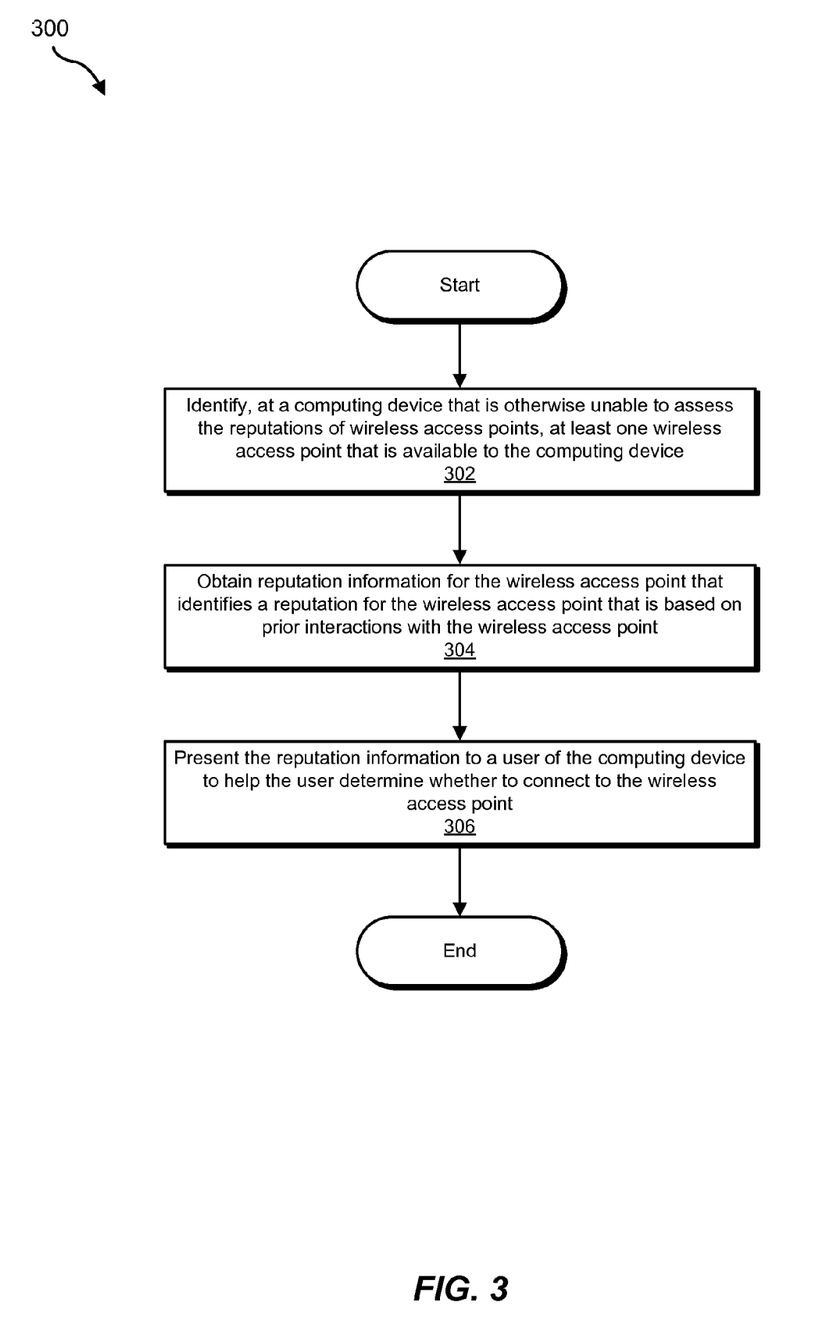
FIG. 3 is a flow diagram of an exemplary method for enabling otherwise unprotected computing devices to assess the reputations of wireless access points.

FIG. 3 is a flow diagram of an exemplary computer-implemented method 300 for enabling otherwise unprotected computing devices to assess the reputations of wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 the systems described herein may identify, at a computing device that is otherwise unable to assess the reputations of wireless access points, at least one wireless access point that is available to the computing device. For example, identification module 104 may, as part of computing device 202 in FIG. 2, identify at least one wireless access point (e.g., one or more of wireless access points 210(1)-(N)) that is available to computing device 202.

In some examples, the computing device that is otherwise unable to assess the reputations of wireless access points may represent a computing device that does not support or allow the installation of security software capable of managing or controlling network activity or security. Examples of such devices include, without limitation, mobile computing devices (such as APPLE IOS and GOOGLE ANDROID devices). In other examples, the computing device that is otherwise unable to assess the repetitions of wireless access points may represent a computing device that supports the installation of security software that is capable of managing or controlling network security, but on which such security software has not been installed. For example, computing device 202 may represent a desktop, laptop, or tablet computing device that employs a traditional full-featured operating system (such as MICROSOFT WINDOWS or MAC OS), but that is otherwise unprotected by security software (such as NORTON ANTIVIRUS).

The term "wireless access point," as used herein, generally refers to a device that enables wireless devices to connect to a wired network (such as the Internet) using one or more wireless standards, such as WIFI or BLUETOOTH. In some examples, a wireless access point may be connected to a gateway or other device that provides access to a wired network. In other examples, the functionality of both a gateway device and a wireless access point may be combined into a single device, such that the wireless access point identified in step 302 may represent both a wireless access point and a gateway device.

The systems described herein may perform step 302 in a variety of ways. In one example, identification module 104 may identify each wireless access point that is currently available (i.e., that is within range) of computing device 202. In another example, identification module 104 may only identify a subset of these wireless access points.

In some examples, identification module 104 (along with the remainder of modules 102) may represent a portion of an application installed on computing device 202. For example, modules 102 may represent an application downloaded from an application distribution platform (such as the APP STORE or the ANDROID MARKET).

At step 304, the systems described herein may obtain reputation information for the wireless access point identified in step 302 from a reputation service. For example, reputation module 106 may, as part of computing device 202 in FIG. 2, obtain reputation information 122 for wireless access point 210(1) from reputation service 206.

The term "reputation information," as used herein, generally refers to information that conveys the opinion of a specific community (such as the user base of a security-software publisher) on the trustworthiness or legitimacy of an object or entity, such as a wireless access point and/or Internet gateway. Examples of reputation information include, without limitation, reputation scores (where, for example, high reputation scores indicate that a wireless access point or Internet gateway is generally trusted within a community and low reputation scores indicate that a wireless access point or Internet gateway is generally untrusted within a community), prevalence information (e.g., information that identifies the number or percentage of user devices within a community that have encountered the wireless access point or Internet gateway), or any other information that may be used to identify a community's opinion on the trustworthiness or legitimacy of a wireless access point or Internet gateway.

Figure 4:
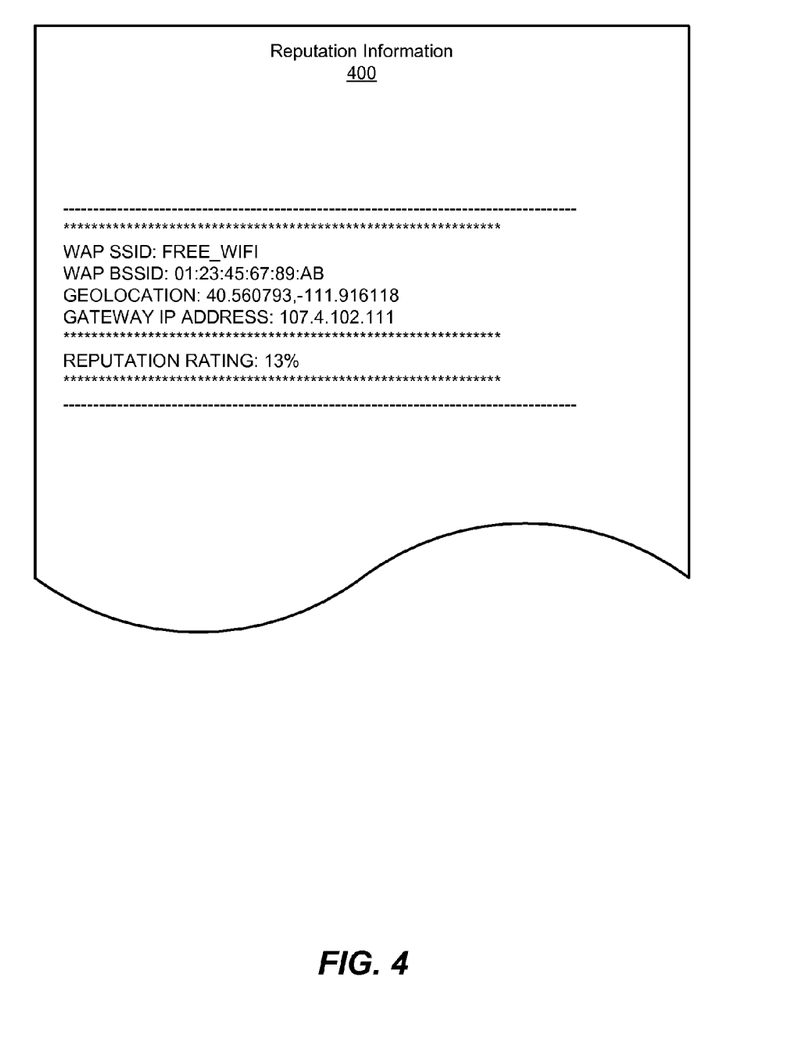
FIG. 4 is a block diagram of exemplary reputation information that may be obtained for a particular wireless access point.

FIG. 4 is an example of reputation information that may be obtained for a particular wireless access point, such as wireless access point 210(1) in FIG. 2. As illustrated in this figure, reputation information 400 may include information that identifies the wireless access point in question. For example, reputation information 400 may identify an SSID associated with the wireless access point (in this example, "FREE_WIFI"), a BSSID associated with the wireless access point (in this example, "01:23:45:67:89:AB"), a known geolocation of the wireless access point (in this example, "40.560793,-111.916118"), the IP address of an Internet gateway associated with the wireless access point (in this example, "107.4.102.111"), and/or any other type or form of information that may be used to identify the wireless access point.

As illustrated in FIG. 4, reputation information 400 may also contain a reputation rating or score for the wireless access point in question. For example, reputation information 400 may indicate that the reputation rating of wireless access point 210(1) is "13%," which may indicate that wireless access point 210(1) is generally regarded as untrustworthy within computing community 240.

The systems described herein may obtain reputation information in a variety of ways. In one example, reputation module 106 may obtain reputation information for a wireless access point from a reputation service, such as reputation service 206. For example, reputation module 106 may (1) transmit a request for reputation information for wireless access point 210(1) to reputation service 206 and then (2) receive, in response to this request, reputation information 122 from reputation service 206.

In some examples, reputation module 106 may include information within this request to reputation service 206 that identifies wireless access point 210(1). Examples of the type of information that may identify (or may be used by reputation service 206 to identify) a wireless access point include, without limitation, an SSID associated with the wireless access point, a BSSID or MAC address associated with the wireless access point, the IP address of an Internet gateway associated with the wireless access point, a wireless networking protocol employed by the wireless access point (e.g., 802.11a/b/g/n), a wireless networking channel number employed by the wireless access point (e.g., "802.11b Channel 11"), the signal strength of the requesting computing device when connected to the wireless access point (e.g., "65 dBm"), the geolocation of the requesting computing device (e.g., "40.560793,-111.916118"), and/or any other type or form of information that may be used to identify the wireless access point and/or its associated Internet gateway.

In some examples, reputation service 206 may use all or a portion of the above-identified information to uniquely identify the wireless access point in question. For example, reputation service 206 may calculate the requesting computing device's approximate distance from (and thus the approximate geolocation of) the wireless access point by comparing the current geolocation of the requesting computing device with the wireless networking protocol employed by the wireless access point, the wireless networking channel number employed by the wireless access point, and/or the signal strength of the requesting computing device.

In another example, the systems described herein may obtain the reputation information by retrieving the same from a local cache stored on the computing device. For example, reputation module 106 may retrieve reputation information 122 from cache 203 on computing device 202. In this example, reputation module 106 may have previously downloaded (e.g., as a background task) and stored reputation information 122 within cache 203 when computing device 202 was previously connected to network 204. As is clear from this example, reputation module 106 may obtain reputation information 122 either before or after computing device 202 connects to a particular wireless access point.

The systems described herein may obtain the reputation information using any of a variety of data connections, such as, for example, wired data connections, wireless data connections, and/or cellular data connections (e.g., GPRS, EDGE, EV-DO, or LTE cellular data connections). For example, if reputation module 106 determines that computing device 202 is not currently connected to a wireless access point, then reputation module 106 may retrieve reputation information 122 via a cellular data connection via cell tower 240.

In some examples, the systems described herein may obtain reputation information for all wireless access points that are currently available to the computing device. In other examples, the systems described herein may obtain reputation information for all known wireless access points within a specific geographic region. For example, reputation module 106 may obtain reputation information for all wireless access points associated with a particular location (e.g., an airport, convention center, or hotel) or within the general area of computing device 202 (such as a particular radius, zip code, city, county, etc.).

In some examples, the systems described herein may obtain the above-described reputation information in response to a request from a user. For example, a user of computing device 202 may, in preparation for a cross-country trip, direct reputation module 106 to obtain reputation information for all known wireless access points available at a particular location, such as an airport or convention center. In this example, reputation module 106 may store this reputation information within a local cache, such as cache 203, so that the user may be able to assess the reputations of wireless access points at this particular location even in the absence of an active data connection.

As detailed above, the reputation information obtained in step 304 may be based at least in part on prior interactions with the wireless access point in question and/or prior interactions with an Internet gateway associated with the wireless access point in question. In some examples, these "prior interactions" may represent direct interactions with the wireless access point in question, direct interactions with an Internet gateway associated with the wireless access point in question, and/or indirect interactions with an Internet gateway associated with the wireless access point in question (via, e.g., interactions with one or more additional wireless access points connected to the Internet gateway).

In one example, a reputation service (such as reputation service 206) may generate reputation information for a particular wireless access point and/or Internet gateway by collecting, aggregating, and analyzing data from user devices within a community (e.g., the user base of a security-software publisher, such as computing community 240 in FIG. 2) that have previously interacted with the wireless access point and/or Internet gateway. Examples of the type of information concerning these prior interactions that may be gathered from such a community include, without limitation, information that identifies the wireless access point and/or the Internet gateway associated with the wireless access point, information that identifies whether communications with the wireless access point are encrypted (and, if so, the encryption or security protocol employed by the wireless access point, such as WEP, WPA, or WPA2), information that identifies at least one attack that originated from the wireless access point and/or Internet gateway (e.g., information that identifies at least one attack that originated from a device connected to the wireless access point and/or Internet gateway), and/or any other type or form of information that may be helpful in evaluating the reputation of the wireless access point and/or Internet gateway. In some examples, by collecting, aggregating, and analyzing this data from potentially millions of user devices within a community (such as the user base of a security-software publisher), reputation services may be able to gain a fairly accurate understanding as to the trustworthiness of a wireless access point and/or Internet gateway.

Figure 5:
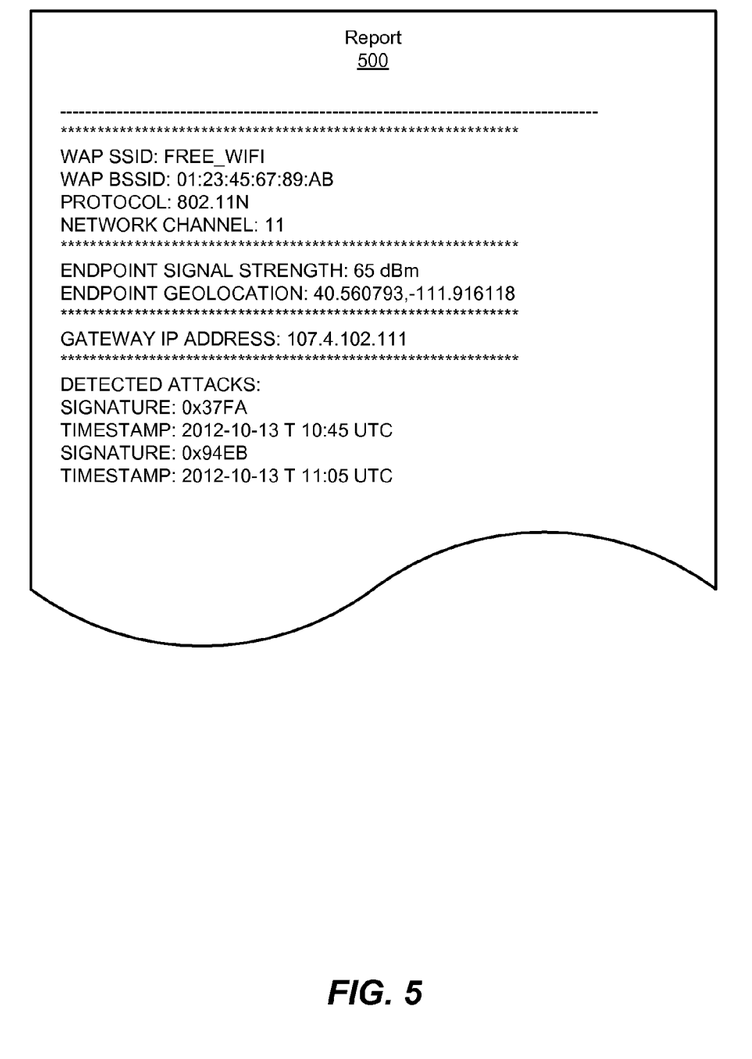
FIG. 5 is a block diagram of an exemplary report containing information concerning prior interactions with a particular wireless access point.

FIG. 5 provides an illustration of the type of information that may be collected, aggregated, and analyzed from user devices within a community. In one example, reputation service 206 may obtain report 500 from a security agent 232 installed on an endpoint (e.g., computing device 230(1)) within computing community 240. In some examples security agent 232 may generate report 500 in response to detecting a threat that originated via a particular wireless access point or Internet gateway. In other examples, security agent 232 may generate report 500 on a periodic or one-time basis (e.g., upon disconnecting from a particular wireless access point or Internet gateway).

As illustrated in FIG. 5, report 500 may contain a variety of information, including information that identifies an SSID associated with a particular wireless access point (in this example, "FREE_WIFI"), a BSSID associated with the wireless access point (in this example, "01:23:45:67:89:AB"), the wireless protocol employed by the wireless access point (in this example, "802.11n"), the reporting endpoint's signal strength when connected to the wireless access point (e.g., "65 dBm"), the reporting endpoint's geolocation (e.g., "40.560793,–111.916118"), the IP address of an Internet gateway associated with the wireless access point (in this example, "107.4.102.111"), and/or any other type or form of information that may be used to identify the wireless access point and/or an Internet gateway associated with the wireless access point. Although not illustrated in FIG. 5, if the reporting endpoint is directly connected to a particular Internet gateway, then report 500 may also contain information that identifies the geolocation of the Internet gateway (derived, e.g., from the reporting endpoint's own geolocation).

Report 500 may also contain information that identifies one or more attacks that originated via the wireless access point and/or Internet gateway in question. For example, report 500 may include both a signature or fingerprint and a timestamp for each attack that occurred on the reporting endpoint while connected to the wireless access point and/or Internet gateway in question.

As detailed above, reputation service 206 may generate reputation information for a particular wireless access point and/or Internet gateway by collecting, aggregating, and/or analyzing data (such as the information contained within report 500 in FIG. 5) from user devices within a community that have previously interacted with the wireless access point and/or Internet gateway. For example, reputation service 206 may assign a reputation rating to a particular wireless access point and/or Internet gateway that is based on the number of attacks that have originated from the wireless access point and/or Internet gateway in question, the type or severity of attacks that have originated from the wireless access point and/or Internet gateway, the frequency of such attacks or how recent such attacks originated from the wireless access point and/or Internet gateway, whether communications with a particular wireless access point are encrypted (and, if so, whether the security or encryption protocol employed by the wireless access point is secure), and/or any other type or form of information that may be relevant in evaluating the trustworthiness or reputation of a particular wireless access point and/or Internet gateway. As detailed above, by collecting, aggregating, and/or analyzing this data from potentially millions of user devices within the community (such as the user base of a security-software publisher), reputation service 206 may assign reputation ratings to wireless access points and/or Internet gateways that provide a fairly accurate indication as to the trustworthiness of the wireless access point and/or Internet gateway.

Returning to FIG. 3, at step 306 the systems described herein may present the reputation information obtained in step 304 to a user of the computing device to help the user determine whether to connect to the wireless access point identified in step 302. For example, display module 108 may, as part of computing device 202 in FIG. 2, present reputation information 122 (or a representation of reputation information 122) to a user of computing device 202 in order to help the user determine whether to connect to wireless access point 210(1).

Figure 6:
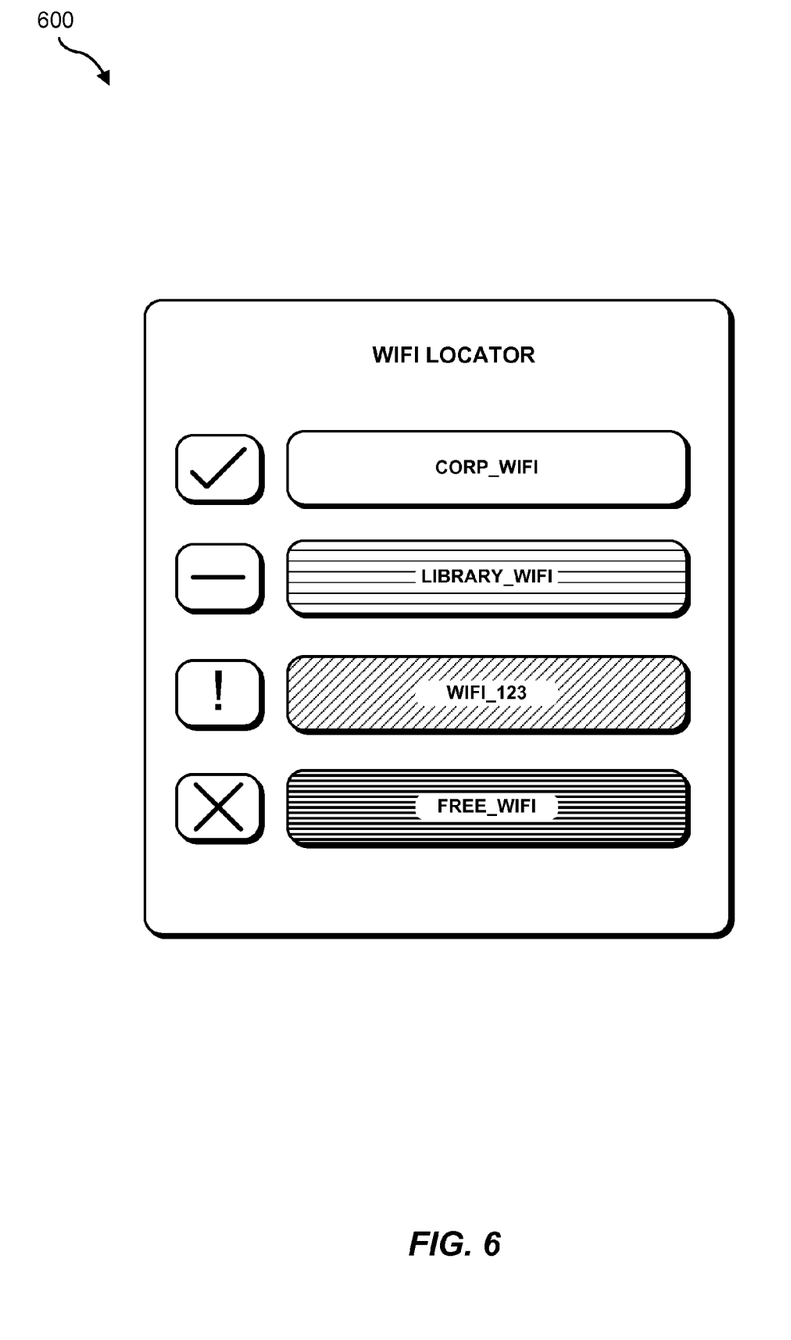
FIG. 6 is a block diagram of an exemplary manner for presenting reputation information for a particular wireless access point.

The systems described herein may perform step 306 in a variety of ways. FIG. 6 is an illustration of an exemplary presentation 600 of the reputation information obtained in step 304. As illustrated in this figure, presentation 600 may present the reputation information using one or more items of texts and/or graphics (and, although not illustrated, using one or more colors or sounds). For example, presentation 600 may use a check mark and/or the color green to indicate that the wireless access point "CORP_WIFI" is safe or secure. In this example, the wireless access point "CORP_WIFI" may be designated by reputation service 206 as safe or secure due to employing a robust encryption protocol and/or due to having an established history that is free of attacks. Similarly, presentation 600 may use a dash symbol and/or the color orange or yellow to indicate that the wireless access point "LIBRARY_WIFI" is moderately safe or secure. In this example, reputation service 206 may have determined that this wireless access point is moderately safe or secure due to the wireless access point employing a moderately secure security or encryption protocol and/or due to having experienced a limited number of non-severe attacks.

In contrast, presentation 600 may use an "X" mark and/or the color red to indicate that the wireless access point "FREE_WIFI" is not safe or secure. In this example, reputation service 206 may have determined that this wireless access point is not safe or secure due to the wireless access point failing to employ a security or encryption protocol and/or due to having experienced a number of serious attacks in the recent past. Presentation 600 may also use an exclamation point and/or the color gray to indicate that there have been an insufficient number of prior interactions with the wireless access point "WIFI_123" to evaluate the reputation of this wireless access point.

In the above example, presentation 600 may enable a user of the computing device to quickly and easily identify safe or secure wireless access points. As such, even if a user has not installed any other security software on his/her device, the user may be able to avoid connecting to unsafe and/or insecure wireless networks.

Figure 7:
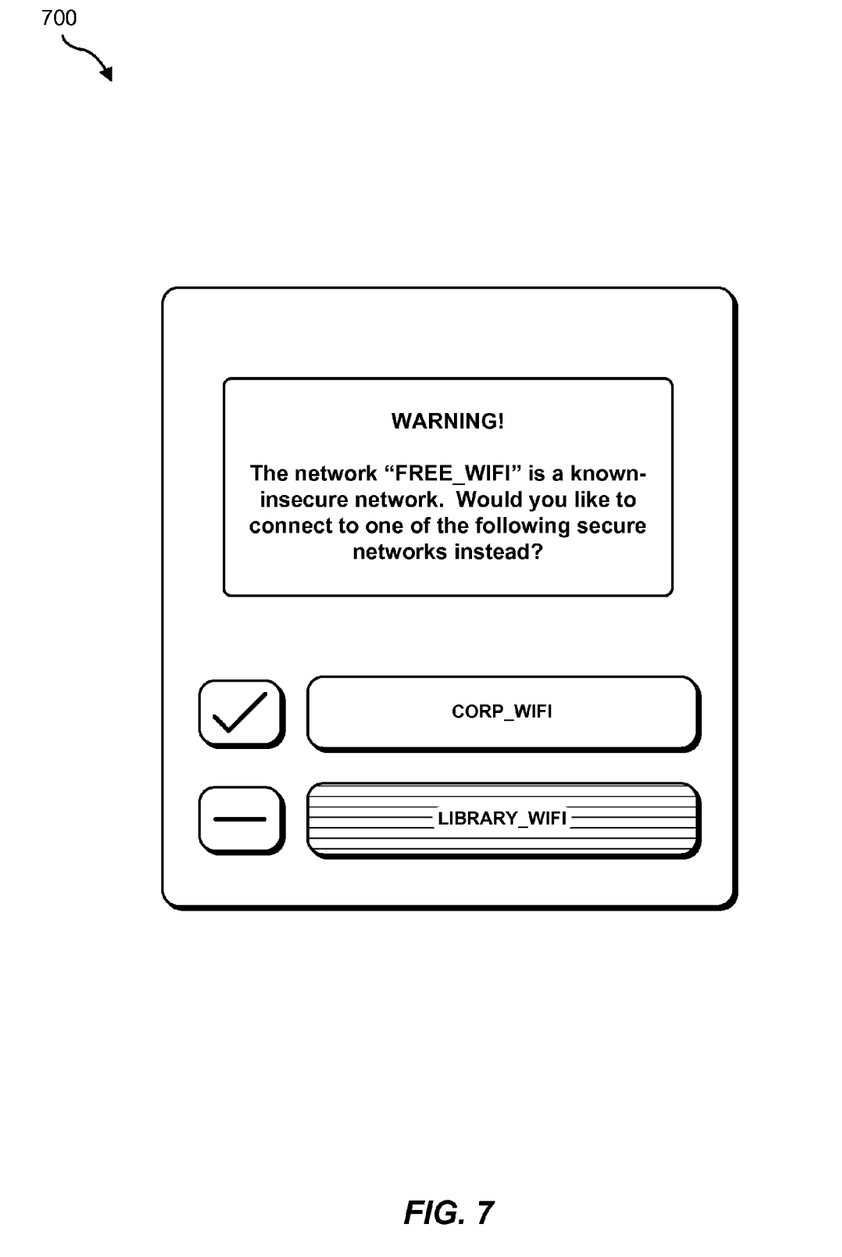
FIG. 7 is a block diagram of an exemplary manner for presenting an alternate wireless access point.

In some examples, the systems described herein may automatically recommend one wireless access point over another due to the reputation of such wireless access points. For example, and as illustrated in FIG. 7, reputation module 106 may determine, based at least in part on reputation information 122, that the wireless access point "FREE_WIFI" fails to satisfy a predetermined reputation threshold (e.g., a reputation threshold that requires a reputation rating of "85%" or above). In this example, display module 108 may recommend at least one alternate wireless access point (e.g., "LIBRARY_WIFI") to a user of computing device 202 that satisfies the predetermined reputation threshold.

In the above example, if the systems described herein detect (despite this recommendation) an attempt by a user of computing device 202 to connect to the wireless access point that fails to satisfy the predetermined reputation threshold, then security module 110 may perform at least one action that results in increased network security on computing device 202. For example, security module 110 may create a secure VPN tunnel with the wireless access point in question in order to at least partially secure all communications with this wireless access point.

As detailed above, by obtaining and then presenting information to a user of a computing device that identifies the reputation of a particular wireless access point available to the computing device, the systems and methods described herein may enable the user to accurately assess the reputation of this wireless access point even if the user has not otherwise installed security software capable of managing or securing the user's network activity. As such, the systems and methods described herein may increase the state of security of computing platforms (such as APPLE IOS or GOOGLE ANDROID devices) that do not permit or allow the installation of traditional network-security applications.

Figure 8:
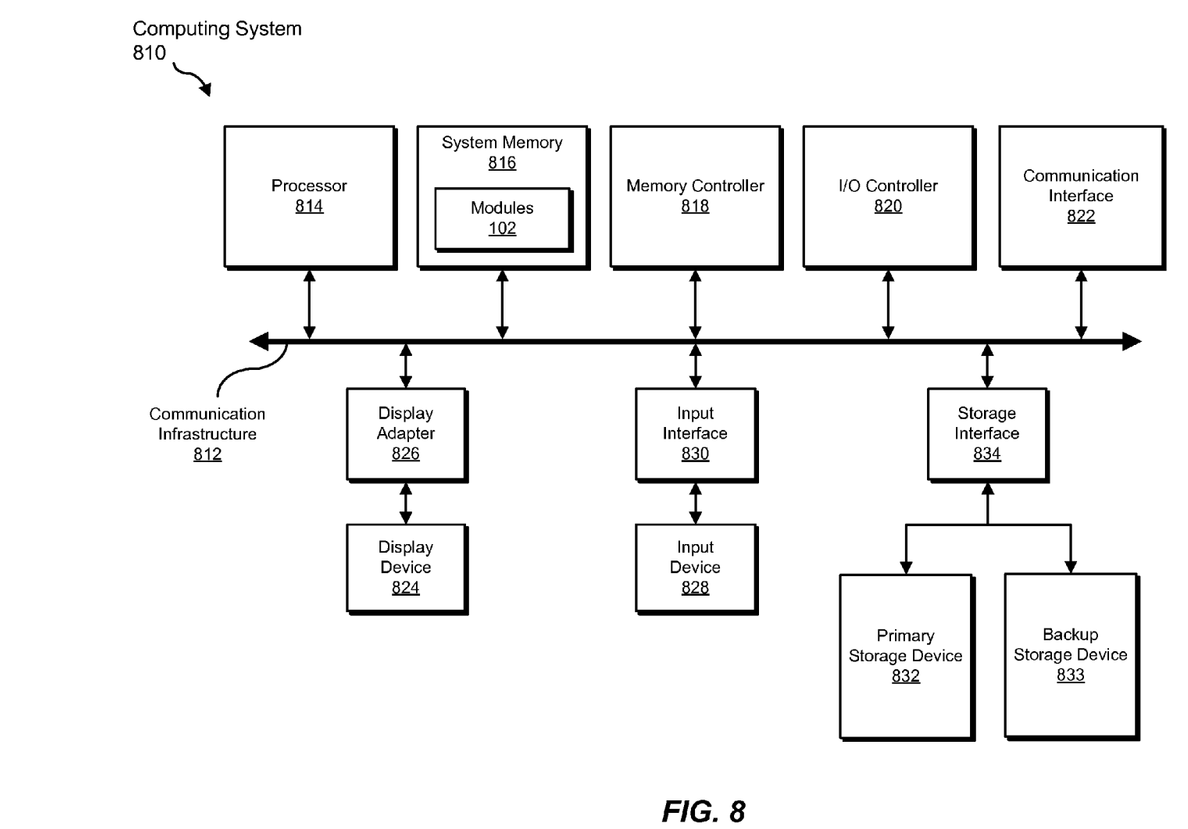
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the identifying, obtaining, presenting, transmitting, receiving, using, retrieving, determining, recommending, detecting, and performing steps described herein. All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
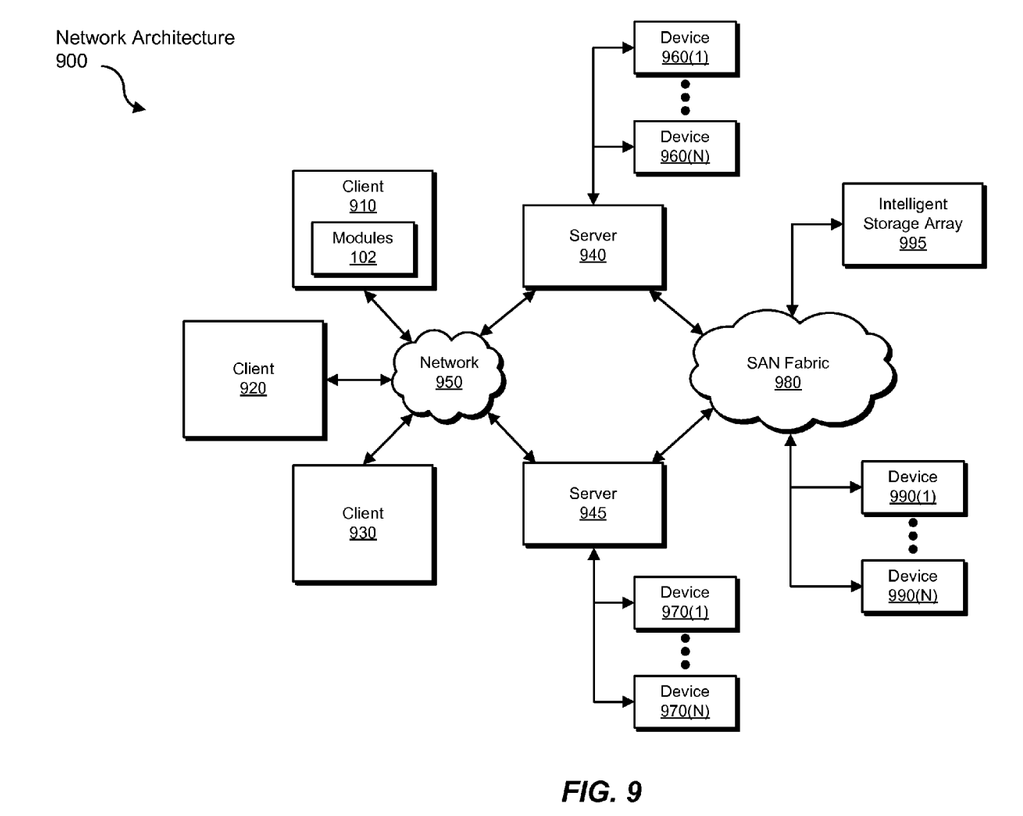
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the identifying, obtaining, presenting, transmitting, receiving, using, retrieving, determining, recommending, detecting, and performing steps disclosed herein. All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for enabling otherwise unprotected computing devices to assess the reputations of wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform an otherwise unprotected computing device into a device that is able to assess the reputation of wireless access points.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling otherwise unprotected computing devices to assess the reputations of wireless access points, the method comprising:

downloading, at a computing device that does not permit the installation of network-security software capable of controlling the computing device's network activity, at least one module from an application distribution platform that is capable of assessing the reputations of wireless access points;

identifying, using the module downloaded from the application distribution platform, at least one wireless access point that is located outside of a region in which the computing device is currently located;

obtaining, from a reputation service via the module downloaded from the application distribution platform, reputation information for the wireless access point that identifies the reputation of the wireless access point, wherein the reputation information is based at least in part on prior interactions with the wireless access point by at least one additional computing device;

presenting, via the module downloaded from the application distribution platform, the reputation information to a user of the computing device to help the user determine whether to connect to the wireless access point.

2. The method of claim 1, wherein obtaining the reputation information comprises:

transmitting a request for the reputation information to the reputation service, wherein the request comprises information that identifies the wireless access point;

receiving, in response to the request, the reputation information from the reputation service.

3. The method of claim 1, wherein obtaining the reputation information comprises retrieving the reputation information from a local cache stored on the computing device.

4. The method of claim 1, wherein obtaining the reputation information comprises obtaining reputation information for all known wireless access points within a specific geographic region or location.

5. The method of claim 1, wherein obtaining the reputation information comprises at least one of:

obtaining the reputation information via a cellular data connection;

obtaining the reputation information via at least one additional wireless access point.

6. The method of claim 1, wherein the reputation of the wireless access point is based at least in part on at least one of:

the recency of attacks that have originated from the wireless access point;

the frequency of attacks that have originated from the wireless access point;

the number of attacks that have originated from the wireless access point.

7. The method of claim 1, wherein the reputation service generated the reputation information for the wireless access point by obtaining and analyzing at least one of:

information concerning the prior interactions with the wireless access point;

information concerning prior interactions with an Internet gateway associated with the wireless access point.

8. The method of claim 7, wherein the information concerning the prior interactions with the wireless access point comprises at least one of:

information that identifies the wireless access point;

information that identifies whether communications with the wireless access point are encrypted;

information that identifies at least one attack that originated from the wireless access point.

9. The method of claim 8, wherein the information that identifies the attack that originated from the wireless access point comprises information that identifies at least one of:

the attack's type;

the attack's severity.

10. The method of claim 8, wherein the information that identifies the wireless access point comprises information that identifies at least one of:

an SSID associated with the wireless access point;

a BSSID associated with the wireless access point;

a wireless networking protocol employed by the wireless access point;

the additional computing device's signal strength when connected to the wireless access point;

a wireless networking channel number employed by the wireless access point;

a geolocation of the additional computing device;

the Internet gateway associated with the wireless access point.

11. The method of claim 7, wherein the information concerning the prior interactions with the Internet gateway comprises at least one of:

information that identifies the Internet gateway;

information that identifies at least one attack that originated from the Internet gateway.

12. The method of claim 11, wherein the information that identifies the Internet gateway comprises information that identifies at least one of:

an IP address associated with the Internet gateway;

a geolocation of the Internet gateway.

13. The method of claim 1, wherein presenting the reputation information for the wireless access point to the user of the computing device comprises presenting the reputation information using at least one of:

at least one item of text;

at least one graphic;

at least one color;

at least one sound.

14. The method of claim 1, further comprising:

determining, based at least in part on the reputation information, that the wireless access point fails to satisfy a predetermined reputation threshold;

recommending at least one alternate wireless access point to the user that satisfies the predetermined reputation threshold.

15. The method of claim 14, further comprising:

detecting an attempt by the computing device to connect to the wireless access point that fails to satisfy the predetermined reputation threshold;

performing at least one action that results in increased network security on the computing device.

16. A system for enabling otherwise unprotected computing devices to assess the reputations of wireless access points, the system comprising at least one processor configured to:

download, at a computing device that does not permit the installation of network-security software capable of controlling the computing device's network activity, at least one module from an application distribution platform that is capable of assessing the reputations of wireless access points;

identify, using the module downloaded from the application distribution platform, at least one wireless access point that is located outside of a region in which the computing device is currently located;

obtain, from a reputation service via the module downloaded from the application distribution platform, reputation information for the wireless access point that identifies the reputation of the wireless access point, wherein the reputation information is based at least in part on prior interactions with the wireless access point by at least one additional computing device;

present the reputation information via the module downloaded from the application distribution platform to a user of the computing device to help the user determine whether to connect to the wireless access point.

17. The system of claim 16, wherein the module downloaded from the application distribution platform obtains the reputation information by retrieving the reputation information from a local cache stored on the computing device.

18. The system of claim 16, wherein the module downloaded from the application distribution platform obtains the reputation information by obtaining reputation information for all known wireless access points within a specific geographic region or location.

19. The system of claim 16, wherein the module downloaded from the application distribution platform is further programmed to:

determine, based at least in part on the reputation information, that the wireless access point fails to satisfy a predetermined reputation threshold;

recommend at least one alternate wireless access point to the user that satisfies the predetermined reputation threshold.

20. A non-transitory computer-readable-storage medium comprising one or more computer-executable instructions that, when executed by at least one processor of a computing device, cause the computing device to:

download, at a computing device that does not permit the installation of network-security software capable of controlling the computing device's network activity, at least one module from an application distribution platform that is capable of assessing the reputations of wireless access points;

identify, using the module downloaded from the application distribution platform, at least one wireless access point that is located outside of a region in which the computing device is currently located;

obtain, from a reputation service via the module downloaded from the application distribution platform, reputation information for the wireless access point that identifies the reputation of the wireless access point, wherein the reputation information is based at least in part on prior interactions with the wireless access point by at least one additional computing device;

present the reputation information via the module downloaded from the application distribution platform to a user of the computing device to help the user determine whether to connect to the wireless access point.

\* \* \* \* \*